Figure 1:
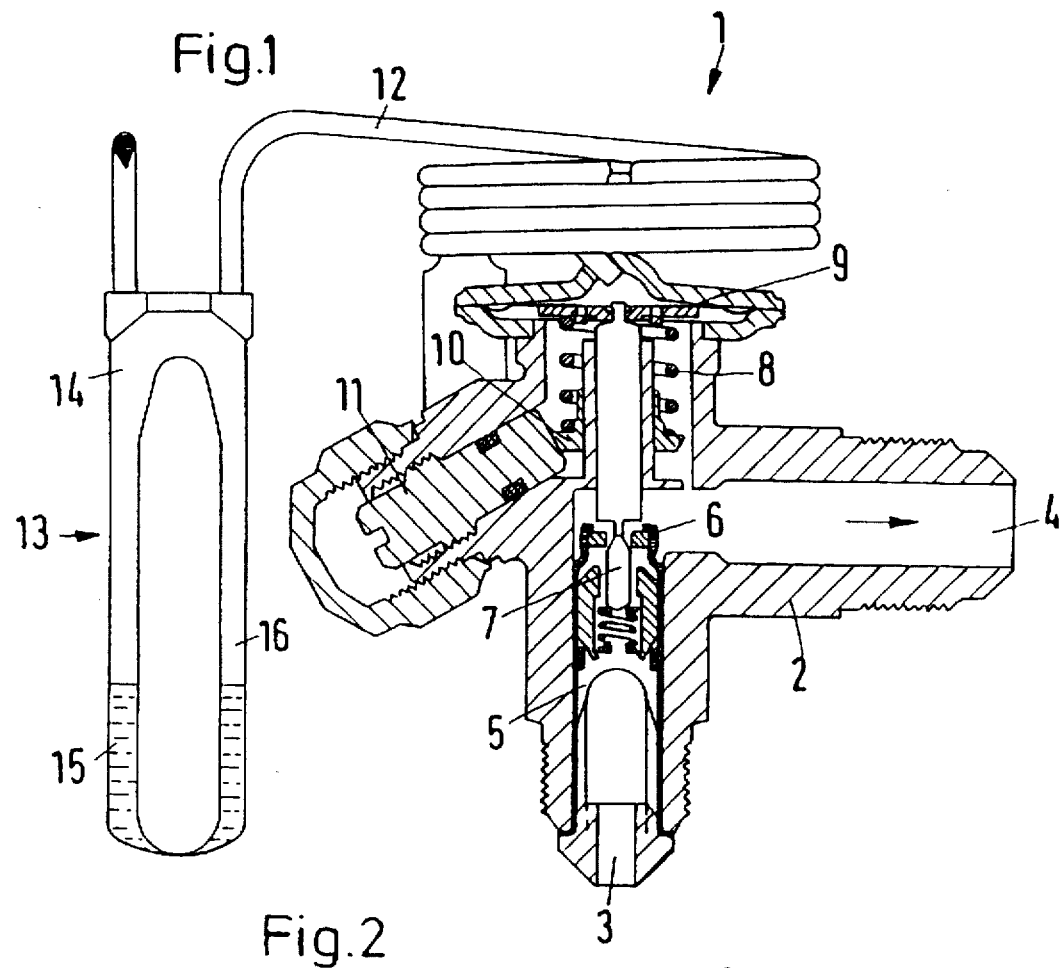

United States Patent [19]
Rudebeck et al.

[11] Patent Number: 5,779,142
[45] Date of Patent: Jul. 14, 1998

[54] METHOD FOR ACHIEVING A SPECIFIC TEMPERATURE BEHAVIOUR OF ADJUSTING ELEMENTS OPERATING IN DEPENDENCE ON TEMPERATURE AND AN ADJUSTING ELEMENT OPERATING IN DEPENDENCE ON TEMPERATURE

[75] Inventors: Viggo Rudebeck, Augustenborg; Jørgen Trelle Pedersen, Nordborg, both of Denmark

[73] Assignee: Danfoss A/S, Nordborg, Denmark

[21] Appl. No.: 687,504

[22] PCT Filed: Feb. 9, 1995

[86] PCT No.: PCT/DK95/00060

§ 371 Date: Jul. 29, 1996

§ 102(e) Date: Jul. 29, 1996

[87] PCT Pub. No.: WO95/22091

PCT Pub. Date: Aug. 17, 1995

[30] Foreign Application Priority Data

Feb. 11, 1994 [DE] Germany ............ 44 04 328.7

[51] Int. Cl.$^6$ .................................................. G05D 23/12
[52] U.S. Cl. .................................................. 236/99 R
[58] Field of Search ............... 236/99 R; 252/67

[56] References Cited

U.S. PATENT DOCUMENTS

| | | | |
|---|---|---|---|
| 3,435,682 | 4/1969 | Linke et al. | 73/368.2 |
| 4,157,976 | 6/1979 | Ostrozynski et al. | 252/67 |
| 4,979,372 | 12/1990 | Tanaka | 62/225 |
| 5,059,338 | 10/1991 | Yoshida et al. | 252/67 |
| 5,304,319 | 4/1994 | Yoshida et al. | 252/67 |

*Primary Examiner*—William E. Tapolcai
*Attorney, Agent, or Firm*—Lee, Mann, Smith, McWilliams, Sweeney & Ohlson

[57] ABSTRACT

A method for achieving a specific temperature behavior of adjusting elements, operating in dependence on temperature, of valves or thermostatic apparatus is disclosed, and also an adjusting element, operating in dependence on temperature, of valves or thermostatic apparatus. Such adjusting elements work in many cases by means of pressure from a pressure chamber, which is provided with a liquid-gas filling. This filling is in many cases toxic or environmentally harmful, in order to achieve satisfactorily the desired temperature behavior. In order to be able to use also non-toxic and environmentally harmless substances, the pressure chamber is filled with a zeotropic mixture of at least two substances. The ratio of component substances is set in dependence on the desired temperature behavior.

17 Claims, 3 Drawing Sheets

METHOD FOR ACHIEVING A SPECIFIC TEMPERATURE BEHAVIOUR OF ADJUSTING ELEMENTS OPERATING IN DEPENDENCE ON TEMPERATURE AND AN ADJUSTING ELEMENT OPERATING IN DEPENDENCE ON TEMPERATURE

The invention relates to a method for achieving a specific temperature behaviour of adjusting elements of valves or thermostatic apparatus, which elements operate in dependence on temperature, and an adjusting element operating in dependence on temperature.

One class of temperature-dependent adjusting elements, as disclosed, for example, in U.S. Pat. No. 5,044,170, has a pressure chamber which is filled partially with fluid and partially with gas, the gas-filled part of the pressure chamber containing at least in part the gaseous phase of the liquid. If the temperature to which the pressure chamber is exposed then changes, the temperature of the liquid-gas filling also changes, and consequently the pressure in the pressure chamber. The change in pressure can be detected either by measuring techniques or can be used directly to operate an actuator, for instance, to displace a diaphragm. If the liquid comprises a pure substance, the temperature behaviour of the adjusting element can be predicted relatively easily, because with pure substances there is a simple correlation between pressure and temperature. This correlation can be represented in a pressure-temperature graph by a single line. The adjusting element in the form of a signal transducer between the temperature and the desired output signal, for example, a displacement movement or the actuation of an electrical switch, accordingly has exactly the same simple correlation, which can also be easily predicted in advance.

But many of these pure substances, which are used for a number of common applications, are toxic or at least greatly harmful to the environment. Provided that the adjusting elements are sound and operational, this gives no further cause for concern, but in the event of damage, considerable threats to health or the environment are therefore posed. Disposal of such adjusting elements also becomes especially difficult. By virtue of their filling, the adjusting elements are then frequently classed as special-grade waste.

The invention is based on the problem of achieving a desired temperature-dependent adjustment without using toxic or ecologically harmful substances.

This problem is solved by a method for adjusting the temperature behaviour of adjusting elements which operate in dependence on temperature of valves or thermostatic apparatus which have an actuating element acted on by pressure in a pressure chamber, in that a zeotropic mixture is produced from at least two substances, the mixture is introduced into the pressure chamber and the ratio of component substances is adjusted in dependence on the desired temperature behaviour.

One is therefore no longer restricted to the use of a pure substance, which, as stated, is in many cases toxic or ecologically harmful. It is now possible to use substances that are not harmful to the environment and are non-toxic. The desired temperature behaviour is then achieved firstly by using not just one, but several substances and, secondly, by setting the ratio of these component substances so that the desired temperature behaviour is achieved. In most cases the adjusting elements do not need to be changed mechanically at all. By suitable selection of the substances and by suitable setting of the ratio of these component substances, it is possible to simulate the desired temperature behaviour. It should be noted, however, that when using several substances as the filling, the relationship between the temperature and the pressure is generally no longer a simple theoretical one. For zeotropic mixtures, however, the pressure is a clear function of temperature, the ratio of components and the density of the substance. Normally, the boiling point line of multi-substance mixtures differs from the condensing point line. Between the two lines there exists a region in a pressure-temperature graph in which a part of the liquid has already gone over into the gaseous phase, but another part is still in the liquid phase. It is in this region that the resulting pressure-temperature line is found; this can be determined theoretically, but only with considerable effort. According to the invention, however, there is no need to measure the pressure. On the contrary, the effects caused on a change in temperature are used directly as a measure to determine whether the desired temperature behaviour has been achieved or not. It is thus possible to achieve with the desired accuracy a simple correlation between the temperature and the signal of the adjusting element, that is, for example, between the temperature and the distance travelled by the adjusting element, although the correlation between the temperature and the pressure is not quite so simple. With a zeotropic mixture, the gaseous phase can have a different ratio of components from the liquid phase. The use of a zeotropic mixture means that one is no longer restricted to certain ratios of components. The ratio of components per se can nevertheless be very accurately set, because specific amounts of substance are introduced into the pressure chamber, without having to pay heed to whether the substance is in a liquid or gaseous form.

The ratio of components is preferably varied until the desired temperature behaviour is obtained.

It is especially preferred for the ratio of components to be adapted individually to each separate adjusting element. In this manner it is possible to compensate for mechanical inaccuracies which may arise, for example, during manufacture.

A further substance, which is substantially insoluble in the mixture and remains gaseous in the desired temperature range, is preferably added to the mixture. The addition of such a substance enables the pressure in the gaseous phase to be increased, so that the adjusting element is biassed. The output signal of the adjusting element, that is, for example, the displacement movement, is thereby shifted without substantial change in the pressure-signal conversion function taking place. An additive term is merely added to this function.

The gaseous substance is preferably nitrogen, helium or carbon dioxide. Helium can be used at the same time for testing the seal of such an adjusting element.

The problem is also solved by an adjusting element, operating in dependence on temperature, of valves or thermostatic apparatus in which an actuating element is in pressure connection with a pressure chamber, the pressure chamber containing a zeotropic mixture of at least two substances, which are present partially in liquid form and partially in gaseous form.

One is no longer restricted to a single pure substance when charging the pressure chamber. On the contrary, as stated above, a mixture of at least two substances can now be used, the desired temperature behaviour being determined essentially by the ratio of component substances, of which there are at least two. Here, non-toxic and environmentally harmless substances can be used, which do not pose problems during subsequent disposal of such an adjusting element. The choice of component ratio enables the effect of the adjusting element, that is, its output signal, to be set to the required extent in dependence on the temperature. Here, even temperature-dependent signal curves that were not possible with the previously used pure substances can be set. When using a zeotropic mixture, one is not restricted to certain ratios of components in which azeotropy is achieved.

The zeotropic mixture preferably consists of substances from ecologically harmless classes of chemical compounds. Damage to the environment is thus dramatically curtailed.

The following compounds in particular can be used:

halogen-containing compounds, halogen-carbon-containing compounds or halogen-hydrogen-carbon-containing compounds, fluorine-carbon-containing compounds or fluorine-oxygen-carbon-containing compounds, chlorine-carbon-containing compounds or chlorine-oxygen-carbon-containing compounds, hydrocarbons, hydrogen-oxygen-carbon compounds aliphatic hydrocarbons, a selection of the following substances R22, R23, R32, R123, R123a, R124, R125, R134, R134a, R141b, R142b, R143a, R152a, methane, ethane, propane, butane, isobutane, ethylene, propylene, propylene, dimethylether, the substances R22 and R152a, any combination of the above-mentioned substances.

The invention is described below with reference to preferred embodiments in conjunction with the drawings, in which FIG. 1 shows a valve having an actuating element controlled in dependence on temperature.

Figure 2:
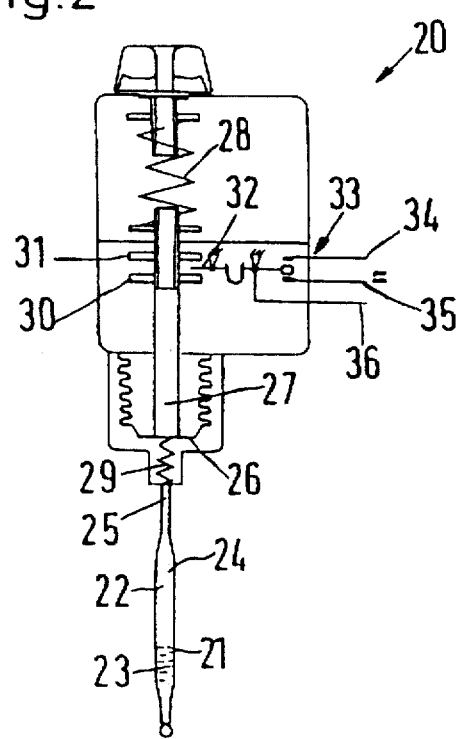
Figure 3:
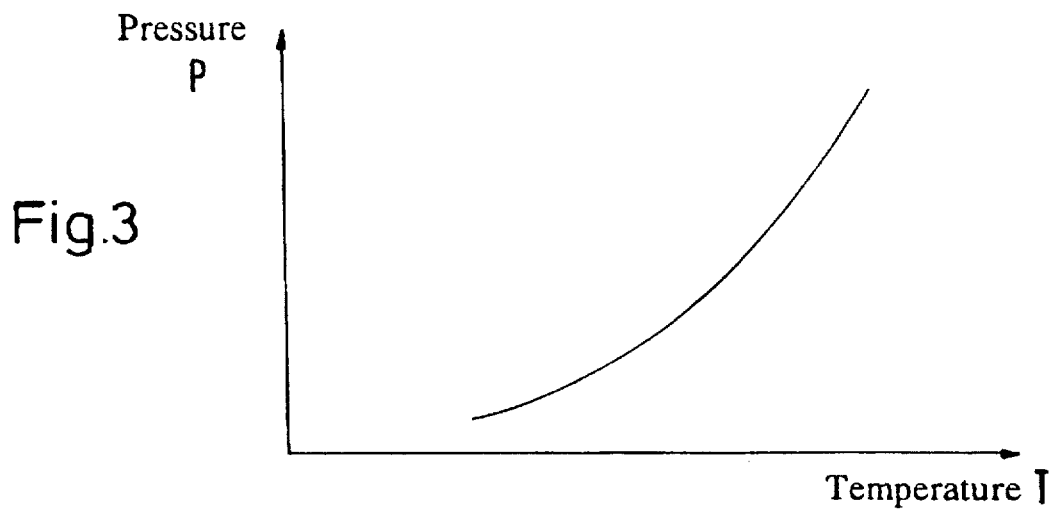
Figure 4:
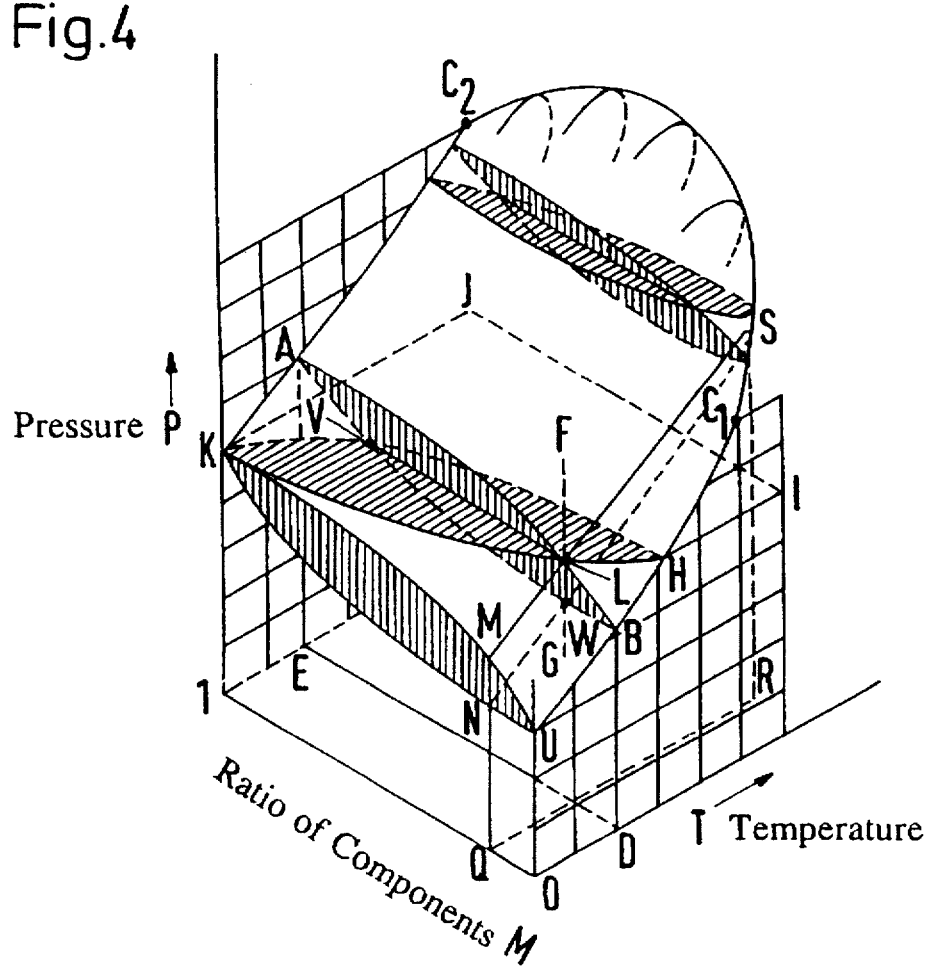
Figure 5:
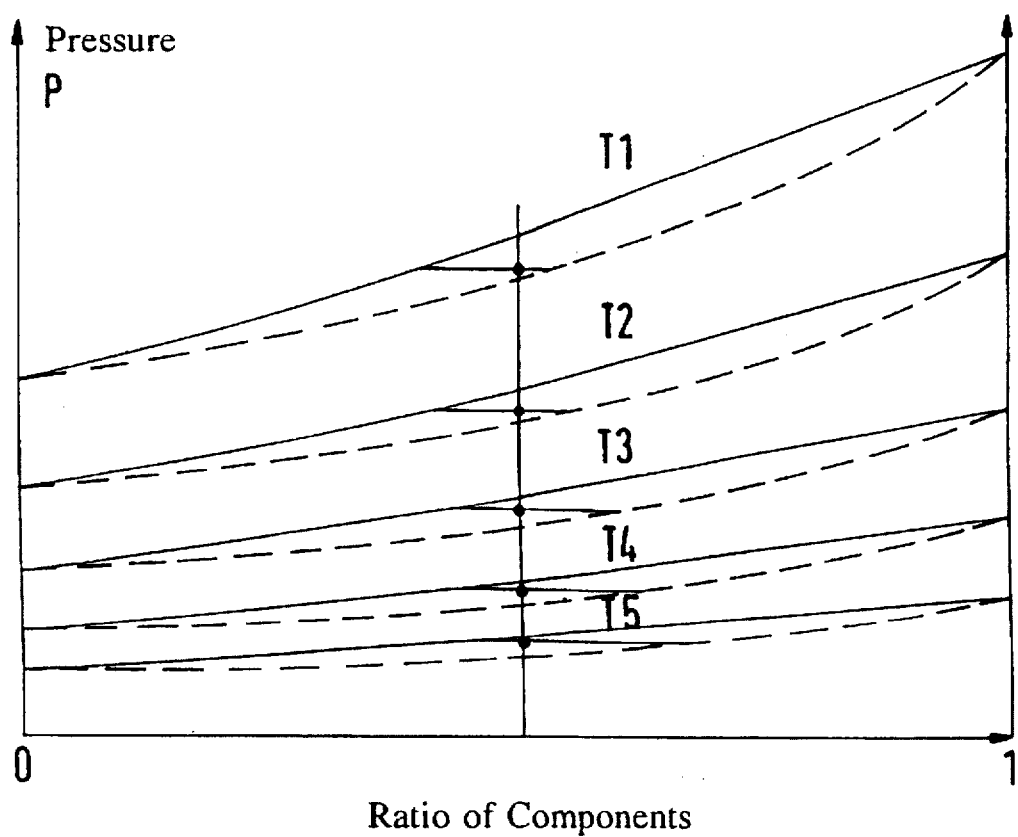

FIG. 2 shows a thermostatic switch having an actuating member controlled in dependence on temperature, FIG. 3 shows a diagrammatic correlation between pressure and temperature for a pure substance, FIG. 4 shows the diagrammatic correlation between pressure, temperature and the ratio of components for a zeotropic mixture, and FIG. 5 shows the correlation between the pressure and ratio of components at different temperatures.

A valve 1 controlled in dependence on temperature comprises a housing 2 with a valve inlet 3 and a valve outlet 4, which are connected to one another by way of a flow channel 5. In the flow channel 5 there is arranged a valve seat 6 against which a closure element 7 can be caused to bear. The closure element 7 is held by a spring 8 in the closed position and is acted upon by a diaphragm 9 in the direction away from the valve seat 6. The spring 8 bears against a supporting disc 10, the position of which can be changed by means of an adjusting screw 11. The bias of the spring 8 and consequently the basic setting of the valve 1 can thereby be changed. The diaphragm 9 is connected on the side remote from the closure element 7 by way of a tubular connection 12, which here, for example, can be in the form of a capillary tube, to a temperature sensor 13, or more accurately speaking, the pressure chamber 14 thereof. The pressure chamber 14 is filled partly with liquid 15 and partly with gas 16. When the temperature around the temperature sensor 13 changes, the pressure conditions in the pressure chamber 14 change. This change in pressure is transmitted by way of the tubular connection 12 to the side of the diaphragm 9 remote from the closure element 7. The pressure exerts a force on the diaphragm 9. Depending on the magnitude of this force, the diaphragm 9 moves the closure element 7 against the force of the spring 8 to a greater or lesser extent away from the valve seat 6. The degree of opening of the valve 1 is thus set in dependence on temperature.

FIG. 2 shows a thermostatic switch 20 having a temperature sensor 21 which has a pressure chamber 22. This is again partly filled with a liquid 23 and partly with a gas 24. The pressure in the pressure chamber 22 acts on the end face of a bellows 26, to the other side of which there is secured a tappet 27. The tappet 27 is held, for a predetermined temperature, in equilibrium by two springs 28, 29.

Secured to the tappet 27 are two arms 30, 31, between which there is arranged an operating lever 32 of a switch 33 having two normally open contacts 34, 35 and one normally closed contact 36. In the neutral position of the tappet 27, the normally closed contact 36 does not touch either of the two normally open contacts 34, 35. If the pressure in the pressure chamber 22 rises, however, the tappet 27 is moved upwards by means of the end face of the bellows 26. The operating lever 32 is pressed upwards by the lower arm 30 so that the normally closed contact 36 connects with the upper normally open contact 34. If the pressure in the pressure chamber 22 drops, the tappet 27 moves in the opposite direction and the normally closed contact 36 is brought into contact with the other normally open contact 35.

Valves and thermostatic apparatus of this kind are known. The filling of the pressure chamber 14, 22 in that case consisted of a pure substance, the pressure-temperature dependency of which is illustrated in FIG. 3. As can be seen, to each temperature T there is exactly one pressure P and vice versa. With this starting point, the temperature behaviour of the actuating element can be calculated, and therefore predicted, relatively accurately. As mentioned initially, the pure substances have, however, the disadvantage that they are in many cases toxic or ecologically harmful.

To fill the pressure chamber 14, 22, use is no longer made of a pure substance but a mixture of at least two substances. The correlation between pressure and temperature is now more complex. It depends additionally on the ratio of components and on the density of the substances. For two substances this is illustrated diagrammatically in FIG. 4. In this illustration, the pressure is plotted upwards, the temperature to the right and rear and the ratio of components to the left and rear. Only for the outer boundaries is there a curve such as that illustrated in FIG. 3. These are the curves $UBHC_1$ and $KAC_2$. These curves in turn, however, represent the curves for pure substances, since they refer to the component ratio of 1:0 and 0:1.

Almost all component ratios between these two extreme values have the peculiarity that the boiling point line and the condensing point line do not coincide. The boiling point line is represented by the curve BLA, whilst the condensing point line is represented by AVWB. At a pressure above the boiling point line a full transition to the liquid phase is effected, at a pressure below the condensing point line a transition to the gaseous phase is effected. Between these there is an indeterminate state, that is, part of the mixture is gaseous and part of the mixture is fluid. It is accordingly difficult to predict the gas pressure in the pressure chamber 14, 22. Both the boiling point line and the condensing point line are very heavily dependent on the ratio of components. This state of affairs is plotted in FIG. 5 for different temperatures T1–T5 assumed to be constant. Here, T1>T2>T3>T4>T5. In principle, FIG. 5 illustrates different intersections each at constant temperature in the P-M plane according to FIG. 4, that is, for example, intersections as apparent from the areas UM-KNU and LLAVWB respectively in FIG. 4. Both illustrations are, of course, only diagrammatic and are not able to reproduce exact values.

The desired temperature behaviour can now be set by varying the ratio of components. Here, a pressure-temperature dependency can be produced as illustrated, for example, by the line NWSFM in FIG. 4. One can clearly see that by changing the ratio of components this pressure-temperature function can be altered. The peaks for different such curves are plotted along the line $C_1SC_2$. With certain constituents, only a limited adjustment of the temperature behaviour is possible, of course. One is, however relatively free as regards the choice of substances to make up the mixture.

The ratio of components can also be further altered as the pressure chambers 14, 22 are being filled in order to adapt the temperature behaviour to individual apparatuses.

All ecologically harmless classes of chemical compounds can be considered as substances that can be used for the mixture. In particular, halogen-containing compounds can be used, for example halogen-oxygen-carbon containing compounds, such as fluorine-carbon-containing compounds or fluorine-oxygen-carbon-containing compounds, or chlorine-carbon-containing compounds or chlorine-oxygen-carbon-containing compounds. Preferred are also chlorine-fluorine-carbon-containing or chlorine-fluorine-oxygen-carbon-containing compounds and hydrocarbons. Hydrogen-oxygen-carbon compounds can also be used, of course, and also aliphatic hydrocarbons. A selection of the following substances can also be used: R22, R23, R32, R123, R123a, R124, R125, R134, R134a, R141b, R142b, R143a, R15a, methane, ethane, propane, butane, isobutane, ethylene, propylane, propylene, dimethylether. A mixture of the substances R22 and R152a is especially advantageous. The ratio of components can in principle be chosen at random, until the desired temperature behaviour has been reached. Zeotropic mixtures in particular can be used. The filling can additionally have added to it a gas, such as helium, nitrogen or carbon dioxide, in order to shift the dependency towards the P-axis (pressure axis) without altering the curve of the function per se.

We claim:

1. A method for achieving a specific temperature behaviour of adjusting elements, operating in dependence on temperature, of valves or thermostatic apparatus which have an actuating element acted on by pressure in a pressure chamber in which method a zeotropic mixture, from at least two component substances, is introduced into the pressure chamber, which mixture has a boiling point line and a condensing point line which do not coincide, between which lines is an indeterminate state, where part of the mixture is gaseous and part of the mixture is fluid, where an area for operation is limited by the boiling point line and the condensing point line, which area for operation is changed by variation of the ratio of components in order to obtain the desired temperature behaviour.

2. A method according to claim 1, in which the ratio of component substances is varied until the desired temperature behavior is obtained.

3. A method according to claim 2, in which the ratio of component substances is adapted individually to each separate adjusting element.

4. A method according to claim 1, in which a further substance, which is substantially insoluble in the mixture and remains gaseous in a desired temperature range, is added to the mixture.

5. A method according to claim 4, in which the gaseous substance is selected from the group of nitrogen, helium and carbon dioxide.

6. An adjusting element, operating in dependence on temperature, of valves or thermostatic apparatus in which an actuating element is in pressure connection with a pressure chamber, the pressure chamber containing a zeotropic mixture of at least two component substances, which mixture has a boiling point line and a condensing point line which do not coincide, between said lines is an indeterminate state where part of the mixture is gaseous and part of the mixture is fluid, where an area for operation is limited by the boiling point line and the condensing point line, which area for operation is changed by variation of the ratio of components in order to obtain the desired temperature behavior.

7. An adjusting element according to claim 6, in which the zeotropic mixture consists of substances from ecologically harmless classes of chemical compounds.

8. An adjusting element according to claim 6, in which the zeotropic mixture consists of halogen-containing compounds.

9. An adjusting element according to claim 6, in which the zeotropic mixture consists of halogen-carbon-containing compounds or halogen-hydrogen-carbon-containing compounds.

10. An adjusting element according to claim 6, in which the zeotropic mixture consists of fluorine-carbon-containing compounds or fluorine-oxygen-carbon-containing compounds.

11. An adjusting element according to claim 6, in which the zeotropic mixture consists of chlorine-carbon-containing compounds or chlorine-oxygen-carbon-containing compounds.

12. An adjusting element according to claim 6, in which the zeotropic mixture consists of chlorine-fluorine-carbon-containing compounds or chlorine-fluorine-oxygen-carbon-containing compounds.

13. An adjusting element according to claim 6, in which the zeotropic mixture consists of hydrocarbons.

14. An adjusting element according to claim 6, in which the zeotropic mixture consists of hydrogen-oxygen-carbon compounds.

15. An adjusting element according to claim 6, in which the zeotropic mixture consists of aliphatic hydrocarbons.

16. An adjusting element according to claim 6, in which the zeotropic mixture is selected from the group of the following substances: R22, R23, R32, R123, R123a, R124, R125, R134, R134a, R141b, R142b, R143a, R152a, methane, ethane, propane, butane, isobutane, ethylene, propylane, propylene, dimethylether.

17. An adjusting element according to claim 6, in which the zeotropic mixture consists of the substances R22 and R152a.

* * * * *